(12) United States Patent
Bostick et al.

(10) Patent No.: US 10,262,044 B2
(45) Date of Patent: Apr. 16, 2019

(54) LIMITING INTERRUPTIONS AND ADJUSTING INTERRUPTION SOUND LEVELS

(71) Applicant: International Business Machines Corporation, Armonk, NY (US)

(72) Inventors: James E. Bostick, Cedar Park, TX (US); John M. Ganci, Jr., Cary, NC (US); Martin G. Keen, Cary, NC (US); Brian M. O'Connell, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/891,461

(22) Filed: Feb. 8, 2018

(65) Prior Publication Data

US 2018/0349383 A1 Dec. 6, 2018

Related U.S. Application Data

(63) Continuation of application No. 15/609,522, filed on May 31, 2017.

(51) Int. Cl.
  *G06F 17/30* (2006.01)
  *H04L 12/58* (2006.01)
  *G06Q 10/10* (2012.01)

(52) U.S. Cl.
  CPC ....... *G06F 17/3053* (2013.01); *G06Q 10/109* (2013.01); *H04L 51/24* (2013.01); *H04L 51/26* (2013.01)

(58) Field of Classification Search
  CPC ... G06F 17/3053; G06Q 10/109; H04L 51/24; H04L 51/26
  See application file for complete search history.

(56) References Cited

U.S. PATENT DOCUMENTS 9,324,322 B1 * 4/2016 Torok .................. G10L 15/22
9,451,584 B1    9/2016 Cosenza et al.
(Continued)

FOREIGN PATENT DOCUMENTS

WO    2017131748 A1    8/2017

OTHER PUBLICATIONS

Bostick et al., "Limiting Interruptions and Adjusting Interruption Sound Levels", U.S. Appl. No. 15/609,522, filed May 31, 2017, 31 pages.
(Continued)

*Primary Examiner* — William L Bashore
*Assistant Examiner* — Gregory A Distefano
(74) *Attorney, Agent, or Firm* — Stephanie L. Carusillo

(57) ABSTRACT

In an approach for managing computing interruptions, a processor receives a computing interruption on a computing device. A processor monitors computing activity of a user on the computing device. A processor accesses user preferences, wherein the user preferences are based on an analysis of previous responses by the user to previous computing interruptions. A processor determines a minimum threshold, based on the computing activity of the user and the user preferences, wherein the minimum threshold identifies when a computing interruption is allowed to be presented to the user. A processor determines from the computing interruption, a sender and a context of the computing interruption. A processor assigns a ranking to the computing interruption based on the sender and the context of the computing interruption. A processor compares the ranking to the minimum threshold. A processor determines whether to present the computing interruption, based on the comparison.

1 Claim, 5 Drawing Sheets

(56) References Cited

U.S. PATENT DOCUMENTS

| | | |
|---|---|---|
| 2002/0087649 A1 | 7/2002 | Horvitz |
| 2004/0127198 A1 | 7/2004 | Roskind et al. |
| 2007/0275767 A1 | 11/2007 | Steele |
| 2008/0310305 A1* | 12/2008 | Lee ................... H04M 1/663 370/235 |
| 2012/0226806 A1 | 9/2012 | Knight et al. |
| 2016/0095083 A1 | 3/2016 | Park |
| 2017/0244798 A1 | 8/2017 | Deluca et al. |

OTHER PUBLICATIONS

IBM List of Patent Applications to Be Treated as Related, "Appendix P", Dated Feb. 5, 2018, 2 pages.

* cited by examiner

LIMITING INTERRUPTIONS AND ADJUSTING INTERRUPTION SOUND LEVELS

BACKGROUND

The present invention relates generally to the field of computing device interruptions, and more particularly to deciding whether to allow an interruption and/or to adjust an interruption volume.

Interruptions include any type of interruption that can be received on a computing device. Users of a computing device can receive an interruption in the form of an alert, push notification, chat message, etc. For example, a user of a laptop might receive a meeting reminder alert. An interruption can take the form of a pop-up window that interrupts whatever computing activity the user is doing. Oftentimes, the user can manage these interruptions in the device's settings or within an individual application's settings. One of the ways interruptions can be managed is through volume control. An interruption can generally have the volume turned on, muted, or set to vibrate.

SUMMARY

Aspects of an embodiment of the present invention disclose a method, computer program product, and computer system for managing computing interruptions. A processor receives a computing interruption on a computing device. A processor monitors computing activity of a user on the computing device. A processor accesses user preferences, wherein the user preferences are based on an analysis of previous responses by the user to previous computing interruptions. A processor determines a minimum threshold, based on the computing activity of the user and the user preferences, wherein the minimum threshold identifies when a computing interruption is allowed to be presented to the user. A processor determines from the computing interruption, a sender and a context of the computing interruption. A processor assigns a ranking to the computing interruption based on the sender and the context of the computing interruption. A processor compares the ranking to the minimum threshold. A processor determines whether to present the computing interruption, based on the comparison.

DETAILED DESCRIPTION

Embodiments of the present invention recognize that incoming interruptions on a computing device are not always welcomed by a user. Currently, users can turn individual types of interruptions on or off. However, this all-or-nothing approach does not allow for the situation when a user generally wants a type of interruption to come through, but at certain times, and/or during certain computing activities, the user does not want to be interrupted. Thus, embodiments of the present invention recognize that there is a need for an approach that allows for smartly limiting interruptions to only those a user has deemed important, which is determined through initial user settings and/or machine-learning. Embodiments of the present invention provide an approach for determining, through initial user settings, machine-learning, and/or the user's current activity, whether to permit an interruption.

Additionally, embodiments of the present invention recognize that even when a user does want to receive an interruption, the user might not want the interruption to come through with sound or at the current system volume level. For example, a user may be working in video editing software with the system volume turned up, but does not want an incoming interruption to beep at that same turned up system volume. Currently, users may be able to change the volume setting for an individual type of interruption to on, mute, or vibrate. However, this all-or-nothing approach does not allow for the situation when a user generally wants a type of interruption to come through with the volume on, but at certain times and/or during certain computing activities the user does not want the interruption to come through at the current system volume level. Thus, embodiments of the present invention recognize there is a need for an approach that allows for smart volume control of incoming interruptions. Embodiments of the present invention provide an approach for determining, through initial user settings, machine-learning, and/or the user's current activity, whether to mute or change the volume of an interruption. In this manner, as discussed in greater detail herein, embodiments of the present invention involve determining whether an interruption should be presented, and then if the interruption should be presented, whether the volume of the interruption should be modified in some way.

The present invention will now be described in detail with reference to the Figures.

Figure 1:
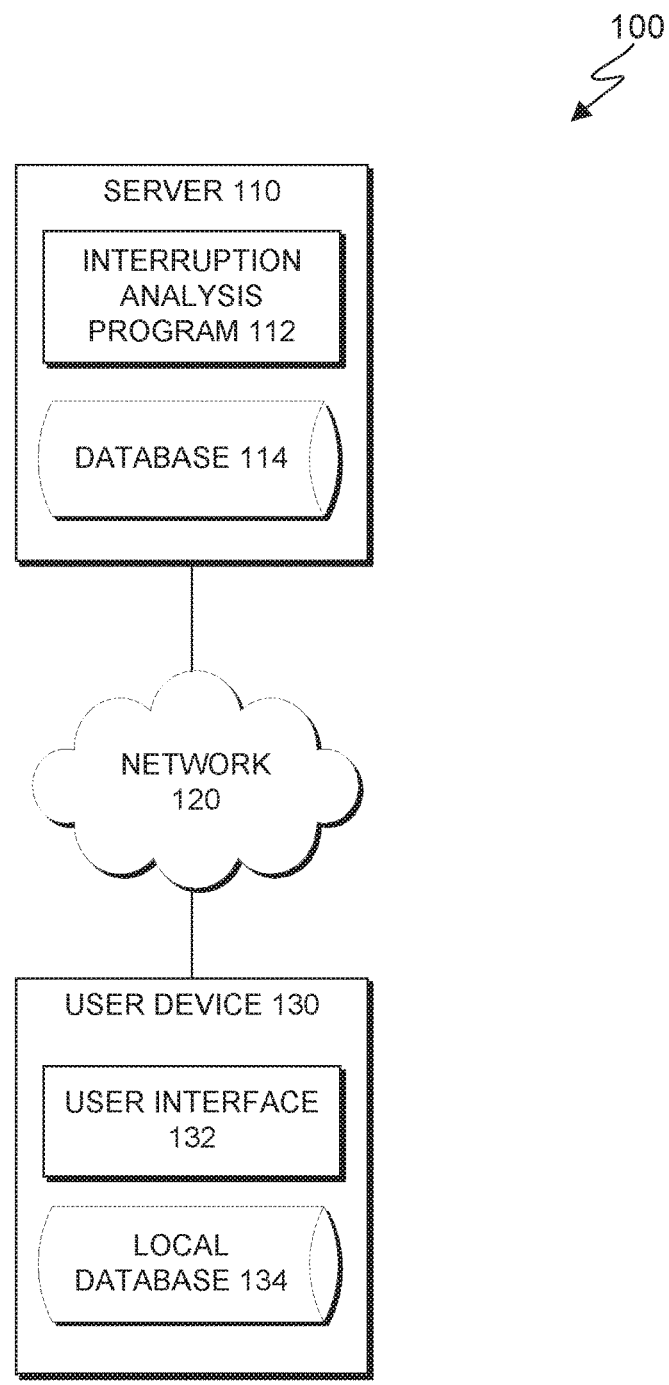
FIG. 1 depicts a functional block diagram illustrating an interruption processing environment, in accordance with an embodiment of the present invention.

FIG. 1 depicts a functional block diagram illustrating interruption processing environment 100, in accordance with an embodiment of the present invention. FIG. 1 provides only an illustration of one embodiment and does not imply any limitations with regard to the environments in which different embodiments may be implemented. In the depicted embodiment, interruption processing environment 100 includes server 110 and user device 130 interconnected over network 120. Interruption processing environment 100 may include additional computing devices, servers, computers, mobile devices, or other devices not shown.

Network 120 may be a local area network (LAN), a wide area network (WAN) such as the Internet, the public switched telephone network (PSTN), a mobile broadband network, such as a 4G and Long Term Evolution (LTE), any combination thereof, or any combination of connections and protocols that will support communications between server 110 and user device 130, in accordance with embodiments of the invention. Network 120 may include wired, wireless, or fiber optic connections.

Server 110 operates to run interruption analysis program 112 and has access to database 114. In an embodiment, server 110 may be a management server, an internet server, or any other electronic device or computing system capable of running a program and receiving and sending data. In other embodiments, server 110 may represent a server computing system utilizing multiple computers as a server system, such as in a cloud computing environment. In some embodiments, server 110 may be a laptop computer, tablet computer, netbook computer, personal computer (PC), a desktop computer, a smart phone, or any programmable electronic device. In the depicted embodiment, server 110 contains interruption analysis program 112 and database 114. Server 110 may include components as depicted and described in further detail with respect to FIG. 5.

Interruption analysis program 112 operates to determine, through user preferences and the user's current activity, whether to permit an interruption, and then if the interruption should be permitted and/or whether the volume of the interruption should be modified in some way. Interruptions include any type of interruption that can be received on a user device, such as a system alert, email, alert, push notification, chat message, etc. In an embodiment, interruption analysis program 112 has access to database 114 to store and retrieve user preferences, including user system settings, application interruption settings, and machine-learned data. In the depicted embodiment, interruption analysis program 112 resides on server 110. In another embodiment, interruption analysis program 112 may reside elsewhere within interruption processing environment 100 provided interruption analysis program 112 has access to database 114 and user device 130 has access to interruption analysis program 112.

Database 114 is a repository for user preferences, including, but not limited to, user system settings, application interruption settings, and machine-learned data. A database is an organized collection of data. Database 114 can be implemented with any type of storage device capable of storing data and configuration files that can be accessed and utilized by server 110, such as a database server, a hard disk drive, or a flash memory. In an embodiment, database 114 is accessed by interruption analysis program 112 to store user preferences. In another embodiment, database 114 is accessed to use user preferences. In the depicted embodiment, database 114 resides on server 110. In another embodiment, database 114 may reside elsewhere within interruption processing environment 100 provided interruption analysis program 112 has access to database 114.

User preferences include, but are not limited to, general user system settings regarding interruptions and volume control, such as for user device 130, application interruption settings, specific user profile settings for interruption analysis program 112, and machine-learned data. Machine-learned data includes, but is not limited to, data regarding how a user has previously responded or reacted to an incoming interruption and past results of iterations of interruption analysis program 112. Machine-learned data comes from interruption analysis program 112 self-learning appropriate interruption rankings through tracked user activity and user reactions to received interruptions with the purpose of improving each interruption ranking assignment to better coincide with how the user would react to each individual interruption.

User device 130 operates to run user interface 132 and local database 134. In some embodiments, user device 130 may be a laptop computer, tablet computer, netbook computer, personal computer (PC), a desktop computer, a smart phone, or any programmable electronic device. In the depicted embodiment, user device 130 contains user interface 132 and local database 134. Local database 134 is a local repository for user preferences and temporarily withheld interruptions. Local database 134 can be implemented with any type of storage device capable of storing data and configuration files that can be accessed and utilized by user device 130, such as a database server, a hard disk drive, or a flash memory. In an embodiment, local database 134 is accessed by interruption analysis program 112 to store temporarily withheld interruptions until interruption analysis program 112 determines the interruption can be presented to on user device 130. In an embodiment, local database 134 is accessed by interruption analysis program 112 to store user preferences. In another embodiment, database 114 is accessed by interruption analysis program 112 to obtain withheld interruptions and user preferences. User device 130 may include components as depicted and described in further detail with respect to FIG. 5.

User interface 132 operates as a local user interface on user device 130 of interruption analysis program 112. In an embodiment, user interface 132 is a local mobile application user interface of interruption analysis program 112. In an embodiment, user interface 132 enables a user to create a local user profile for interruption analysis program 112. Within the local user profile, the user can set user profile settings establishing a minimum allowable interruption ranking associated with different user activities on a user device. Additionally, within the local user profile, the user can set user profile settings establishing an assigned interruption ranking for each type of interruption. The assigned interruption ranking can be based on who or where the interruption is coming from and the nature of the interruption itself. The ranking system can be any variety of quantifiable values, such as 1 to 5, where 1 is the least important and 5 is the most important. For example, a user can establish that for a word processing program the allowable interruption ranking must be a 3 or higher for the interruption to be allowed. In another example, a user can establish that when browsing the Internet all interruptions are allowed. In another example, a user can establish that when giving a presentation the allowable interruption ranking must be a 5 for the interruption to be allowed.

Figure 2:
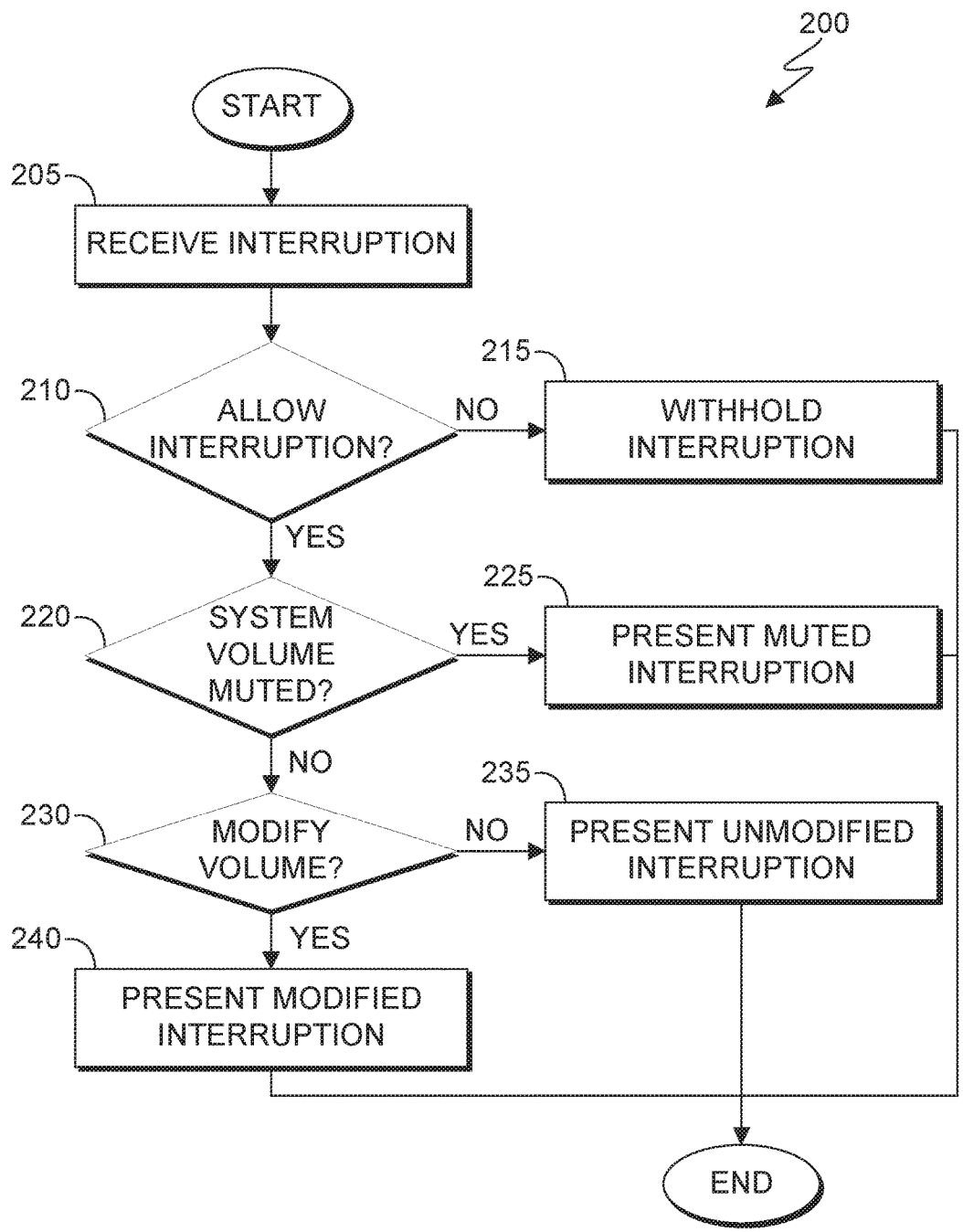
FIG. 2 depicts a flowchart depicting operational steps of an interruption analysis program executing within the interruption processing environment of FIG. 1, in accordance with an embodiment of the present invention.

FIG. 2 depicts a flowchart depicting operational steps of interruption analysis program 112 executing within the interruption processing environment of FIG. 1, in accordance with an embodiment of the present invention. In the depicted embodiment, interruption analysis program 112 operates to determine through user preferences and/or the user's current activity whether to permit an interruption, and then if the interruption should be permitted, whether the volume of the interruption indicator should be modified in some way. It should be appreciated that the process depicted in FIG. 2 illustrates one possible iteration of interruption analysis program 112, which repeats for each received interruption.

In step 205, interruption analysis program 112 receives an interruption. Interruptions may include, but are not limited to, push notifications, email alerts, system alerts, and chat messages. In an embodiment, interruption analysis program 112 receives a request to display or push an interruption to a user device, such as user device 130. For example, interruption analysis program 112 receives a push notification from a news application on a smartphone. In another example, interruption analysis program 112 receives a chat message from a messaging program on a laptop computer.

In decision 210, interruption analysis program 112 determines if the interruption is allowed. In an embodiment, interruption analysis program 112 determines if the interruption should be presented on user device 130. Decision 210 is described in further detail with respect to flowchart 300 in FIG. 3. If in decision 210, interruption analysis program 112 determines that the interruption should be allowed, then interruption analysis program 112 moves on to decision 220. If in decision 210, interruption analysis program 112 determines that the interruption should not be allowed, then interruption analysis program 112 moves on to step 215, in which interruption analysis program 112 withholds the interruption.

In step 215, interruption analysis program 112 withholds the interruption. In an embodiment, interruption analysis program 112 does not present the interruption on the user device, such as user device 130. In an embodiment, interruption analysis program 112 stores the withheld interruption in local database 134 until interruption analysis program 112 determines the interruption can be presented on user device 130. In an embodiment, interruption analysis program 112 determines when the interruption can be presented based on the interruption itself and the current user activity. For example, in a work environment, if the user closes out of a work task and opens a non-work related website, interruption analysis program 112 presents the withheld interruption to the user.

In decision 220, interruption analysis program 112 determines if the system volume is muted. In an embodiment, interruption analysis program 112 determines if a user device, such as user device 130, has its system volume muted or not. If in decision 220, interruption analysis program 112 determines that the system volume is muted, then interruption analysis program 112 moves on to step 225, in which interruption analysis program 112 presents the muted interruption. If in decision 220, interruption analysis program 112 determines that the system volume is unmuted, then interruption analysis program 112 moves on to step 230, where interruption analysis program 112 determines whether the volume of the interruption indicator should be modified.

In decision 230, interruption analysis program 112 determines if the interruption indicator volume should be modified. In an embodiment, interruption analysis program 112 determines if the interruption should be presented on user device 130 with no volume, a modified volume, or the current system volume. Decision 230 is described in further detail with respect to flowchart 400 in FIG. 4. If in decision 230, interruption analysis program 112 determines that the interruption indicator volume should not be modified, then interruption analysis program 112 moves on to step 225, in which interruption analysis program 112 presents the interruption with the volume unmodified. If in decision 230, interruption analysis program 112 determines that the volume of the interruption indicator should be modified, then interruption analysis program 112 moves on to step 240, where interruption analysis program 112 presents the interruption at a volume level determined in decision 230.

Figure 3:
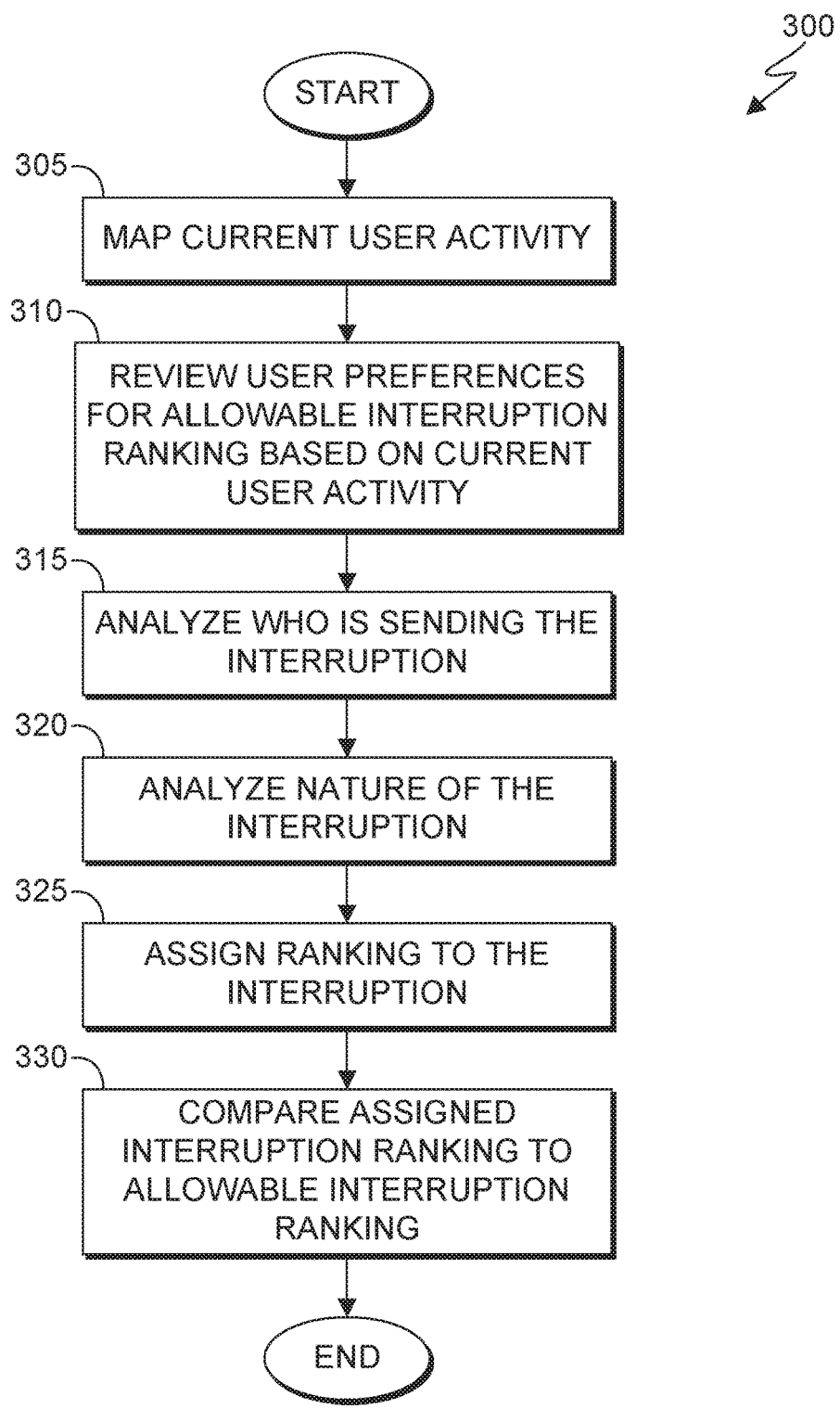
FIG. 3 depicts a flowchart of the steps of an interruption allowance determination, in accordance with an embodiment of the present invention.

FIG. 3 depicts a flowchart 300 of the more detailed steps of interruption allowance determination step 210 of interruption analysis program 112, in accordance with an embodiment of the present invention. In the depicted embodiment, interruption allowance determination step 210 of interruption analysis program 112 operates to determine whether an interruption to a user device should be presented or withheld until a later time dependent on an analysis of the interruption and/or an analysis of the current activity on the user device. It should be appreciated that the process depicted in FIG. 3 illustrates one possible iteration of interruption allowance determination step 210, which repeats for each time interruption analysis program 112 receives an interruption.

In step 305, interruption analysis program 112 maps a current user's activity. In an embodiment, interruption analysis program 112 maps what a user is currently working on by monitoring an active window and/or determining what windows are in the foreground on a user device, such as user device 130. In an embodiment, interruption analysis program 112 uses cameras, an eye gazing application, and/or a mapping application to determine what window or part of a screen of a user device that the user is staring at or actively working with.

In step 310, interruption analysis program 112 reviews user profile settings and/or machine-learned data for allowable interruption ranking based on the current user's activity. In an embodiment, interruption analysis program 112 retrieves user profile settings and machine-learned data from database 114 and local database 134. In an embodiment, interruption analysis program 112 analyzes user profile settings and machine-learned data related to the current user activity to determine an allowable interruption ranking, which is the minimum interruption ranking an interruption needs to be allowed.

In step 315, interruption analysis program 112 analyzes who is sending the interruption. In an embodiment, interruption analysis program 112 analyses where or who the interruption is coming from. For example, if the interruption is a chat message, interruption analysis program 112 analyzes who the message is being sent from, such as is it from a known contact, unknown contact, or a contact specially designated in some way.

In step 320, interruption analysis program 112 analyzes the nature of the interruption. In an embodiment, interruption analysis program 112 analyzes the context of the interruption through natural language processing and/or classification techniques (e.g., deep linguistic processing, sentence splitting, named entry recognition, tokenization, word sense disambiguation, chunking, parsing, topic segmentation, etc.) to process the semantics of the interruption. In an embodiment, using natural language processing and at least one set of dictionaries and rules, interruption analysis program 112 uses text analytics to parse through the interruption. Text analytics can be performed using an Unstructured Information Management Architecture (UIMA) application configured to analyze unstructured information to discover patterns relevant to interruption analysis program 112 by processing plain text and identifying words that may affect the assigned interruption ranking.

In step 325, interruption analysis program 112 assigns a ranking to the interruption. In an embodiment, interruption analysis program 112 assigns a ranking to the interruption by comparing user profile settings and machine-learned data to who is sending the interruption and the nature of the interruption.

In step 330, interruption analysis program 112 compares the assigned interruption ranking to the allowable interruption ranking. If the assigned interruption ranking is equal to or greater than the allowable interruption ranking, then the interruption will be allowed and interruption analysis program 112 will proceed to decision 220. If the assigned interruption ranking is less than the allowable interruption ranking, then the interruption will not be allowed and interruption analysis program 112 will proceed to step 215.

Figure 4:
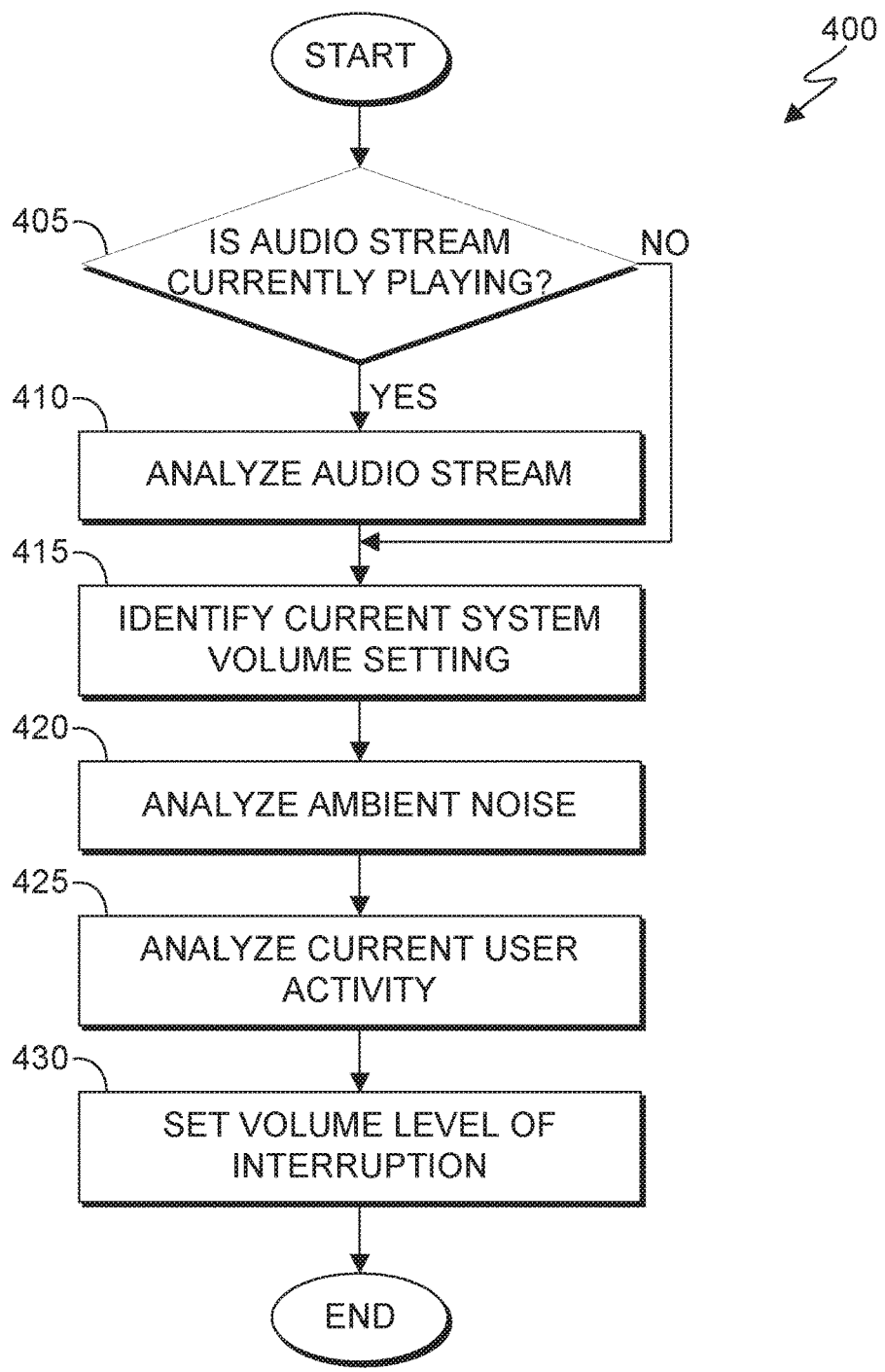
FIG. 4 depicts a flowchart of the steps of an interruption volume determination, in accordance with an embodiment of the present invention.

FIG. 4 depicts a flowchart 400 of the more detailed steps of interruption volume determination step 230 of interruption analysis program 112, in accordance with an embodiment of the present invention. In the depicted embodiment, interruption volume determination step 230 of interruption analysis program 112 operates to determine whether the volume of the interruption indicator should be modified in some way. It should be appreciated that the process depicted in FIG. 4 illustrates one possible iteration of interruption volume determination step 220, which repeats for each time interruption analysis program 112 determines that the system volume is unmuted.

In decision 405, interruption analysis program 112 determines whether an audio stream is currently playing. In an embodiment, interruption analysis program 112 maps the current user activity to see if an audio stream is currently being played on a user device, such as user device 130. If interruption analysis program 112 determines that an audio stream is not currently playing, then interruption analysis program 112 proceeds to decision 415. If interruption analysis program 112 determines that an audio stream is currently playing, then interruption analysis program 112 proceeds to step 410.

In step 410, interruption analysis program 112 analyzes the audio stream. In an embodiment, interruption analysis program analyzes which computing application, program, or website is generating the audio stream. In an embodiment, interruption analysis program 112 analyzes metadata and/or any contextual information associated with the audio stream. For example, in a work situation, interruption analysis program 112 determines whether the audio stream is work-related or personal business, and this may be a factor in determining whether it is appropriate to interrupt the audio stream with an audible interruption.

In step 415, interruption analysis program 112 identifies a current system volume setting. In an embodiment, interruption analysis program 112 identifies a current system volume setting on a user device, such as user device 130. In another embodiment, interruption analysis program 112 identifies a current computing activity or application volume setting on a user device, such as user device 130.

In step 420, interruption analysis program 112 analyzes ambient noise. In an embodiment, interruption analysis program 112 analyzes the level of ambient noise in the environment surround a user device, such as user device 130, using a microphone of the user device (not shown).

In step 425, interruption analysis program 112 analyzes current user activity. In an embodiment, if an audio stream was not playing, interruption analysis program 112 analyzes current user activity to determine what a user is currently working on, such as what windows are in the foreground on a user device, such as user device 130. In an embodiment, interruption analysis program 112 uses cameras, an eye gazing application, and/or a mapping application to determine what window or part of a screen of a user device that the user is staring at or actively working on.

In step 430, interruption analysis program 112 sets a volume level of the interruption. In an embodiment, interruption analysis program 112 sets a volume level of the interruption based on the analyses done in decision 405 through step 425. Decision 405 through step 425 are each factors to consider in setting an appropriate volume level of the interruption. For example, if it is determined that an audio stream is playing, the system volume is turned up loud for an audio intensive task such as video editing, and the ambient noise is low, interruption analysis program 112 can mute the interruption or set the volume of the interruption to lower than the system volume level. In another example, if no audio stream is playing, the system volume is loud, and the ambient noise is loud, interruption analysis program 112 can set the volume of the interruption to the system volume level. In yet another example, if no audio stream is playing and the user is away from the user device, the system volume level is high, and the ambient noise level is low, interruption analysis program 112 can set the volume of the interruption to the system volume level or higher if the interruption is deemed that important in the interruption allowance determination step. If interruption analysis program 112 modifies the volume of the interruption, interruption analysis program 112 proceeds to step 235, where the interruption is presented at the system volume level. If interruption analysis program 112 does not modify the volume of the interruption, interruption analysis program 112 proceeds to step 240, where the interruption is presented at the modified volume level.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

Figure 5:
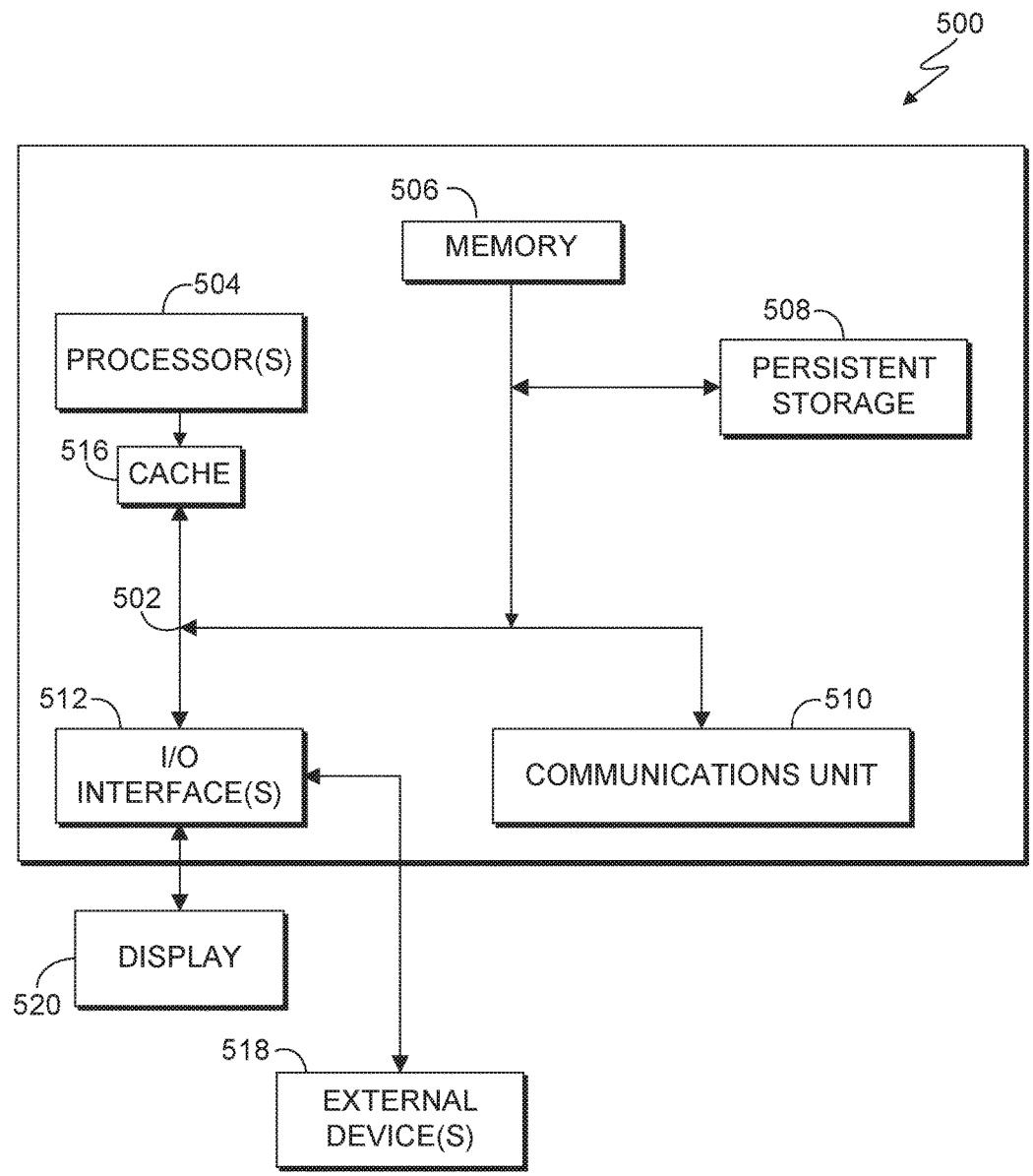
FIG. 5 depicts a block diagram of components of a server or a user device of interruption processing environment, in accordance with an embodiment of the present invention.

FIG. 5 is a block diagram depicting components of a computer 500 suitable for interruption analysis program 112. FIG. 5 displays the computer 500, the one or more processor(s) 504 (including one or more computer processors), the communications fabric 502, the memory 506, the cache 516, the persistent storage 508, the communications unit 510, the I/O interfaces 512, the display 520, and the external devices 518. It should be appreciated that FIG. 5 provides only an illustration of one embodiment and does not imply any limitations with regard to the environments in which different embodiments may be implemented. Many modifications to the depicted environment may be made.

As depicted, the computer 500 operates over a communications fabric 502, which provides communications between the cache 516, the computer processor(s) 504, the memory 506, the persistent storage 508, the communications unit 510, and the input/output (I/O) interface(s) 512. The communications fabric 502 may be implemented with any architecture suitable for passing data and/or control information between the processors 504 (e.g., microprocessors, communications processors, and network processors, etc.), the memory 506, the external devices 518, and any other hardware components within a system. For example, the communications fabric 502 may be implemented with one or more buses or a crossbar switch.

The memory 506 and persistent storage 508 are computer readable storage media. In the depicted embodiment, the memory 506 includes a random access memory (RAM). In general, the memory 506 may include any suitable volatile or non-volatile implementations of one or more computer readable storage media. The cache 516 is a fast memory that enhances the performance of computer processor(s) 504 by holding recently accessed data, and data near accessed data, from memory 506.

Program instructions for interruption analysis program 112 may be stored in the persistent storage 508 or in memory 506, or more generally, any computer readable storage media, for execution by one or more of the respective computer processors 504 via the cache 516. The persistent storage 508 may include a magnetic hard disk drive. Alternatively, or in addition to a magnetic hard disk drive, the persistent storage 508 may include, a solid state hard disk drive, a semiconductor storage device, read-only memory (ROM), electronically erasable programmable read-only memory (EEPROM), flash memory, or any other computer readable storage media that is capable of storing program instructions or digital information.

The media used by the persistent storage 508 may also be removable. For example, a removable hard drive may be used for persistent storage 508. Other examples include optical and magnetic disks, thumb drives, and smart cards that are inserted into a drive for transfer onto another computer readable storage medium that is also part of the persistent storage 508.

The communications unit 510, in these examples, provides for communications with other data processing systems or devices. In these examples, the communications unit 510 may include one or more network interface cards. The communications unit 510 may provide communications through the use of either or both physical and wireless communications links.

Interruption analysis program 112 may be downloaded to the persistent storage 508 through the communications unit 510. In the context of some embodiments of the present invention, the source of the various input data may be physically remote to the computer 500 such that the input data may be received and the output similarly transmitted via the communications unit 510.

The I/O interface(s) 512 allows for input and output of data with other devices that may operate in conjunction with the computer 500. For example, the I/O interface 512 may provide a connection to the external devices 518, which may include a keyboard, keypad, a touch screen, and/or some other suitable input devices. External devices 518 may also include portable computer readable storage media, for example, thumb drives, portable optical or magnetic disks, and memory cards. Software and data used to practice embodiments of the present invention may be stored on such portable computer readable storage media and may be loaded onto the persistent storage 508 via the I/O interface(s) 512. The I/O interface(s) 512 may similarly connect to a display 520. The display 520 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN), a wide area network (WAN), a mobile broadband network, such as a 4G and Long Term Evolution (LTE), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method for managing computing interruptions, the method comprising:

receiving, by one or more processors, a computing interruption on a computing device;

monitoring, by one or more processors, computing activity of a user on the computing device;

accessing, by one or more processors, user preferences, wherein the user preferences are based on an analysis of previous responses by the user to previous computing interruptions;

determining, by one or more processors, a minimum threshold, based on the computing activity of the user and the user preferences, wherein the minimum threshold identifies when a computing interruption is allowed to be presented to the user;

determining, by one or more processors, from the computing interruption, a sender and a context of the computing interruption;

assigning, by one or more processors, a ranking to the computing interruption based on the sender and the context of the computing interruption;

comparing, by one or more processors, the ranking to the minimum threshold;

determining, by one or more processors, whether to present the computing interruption, based on the comparison;

responsive to determining not to present the computing interruption, causing, by one or more processors, the computing interruption to not be presented on the computing device;

storing, by one or more processors, the computing interruption;

responsive to determining to present the computing interruption, determining, by one or more processors, whether to modify a volume of the computing interruption, wherein determining whether to modify the volume of the computing interruption comprises:

determining, by one or more processors, that an audio stream is playing on the computing device, analyzing, by one or more processors, the audio stream, identifying, by one or more processors, a system volume setting of the computing device, determining, by one or more processors, ambient noise surrounding the computing device, and modifying, by one or more processors, the volume of the computing interruption based on the user preferences;

responsive to determining to modify the volume of the computing interruption, presenting, by one or more processors, the computing interruption on the computing device at the modified volume; and responsive to determining not to modify the volume of the computing interruption, presenting, by one or more processors, the computing interruption on the computing device at a default volume level.

* * * * *